United States Patent Office 3,657,422
Patented Apr. 18, 1972

3,657,422
ANTIBIOTIC AABOMYCIN-A AND PROCESS
FOR PREPARING THE SAME
Tomomasa Misato, Tokyo, Keng Tang Huang, Saitama-ken, Shiroh Shirato, Tokyo, Akio Seino, Kanagawa-ken, Yuko Nakamura, Tokyo, and Shojiro Aizawa and Ryusuke Taguchi, Saitama-ken, Japan, assignors to Kaken Kagaku Kabushiki Kaisha, Tokyo, and Rikagaku Kenkyusho, Kitaadachi-gun, Saitama-ken, Japan
Filed Dec. 5, 1969, Ser. No. 882,504
Claims priority, application Japan, Dec. 9, 1968, 43/89,533
Int. Cl. A61k 21/00
U.S. Cl. 424—122
3 Claims

ABSTRACT OF THE DISCLOSURE

A new antibiotic Aabomycin-A having a strong antifungal and antiviral potency is recovered from a culture of Aabomycin-A producing microorganism designated Streptomyces sp. 325–17 (ATCC 21449) as a pure crystal.

BRIEF SUMMARY OF THE INVENTION

Figure 1:
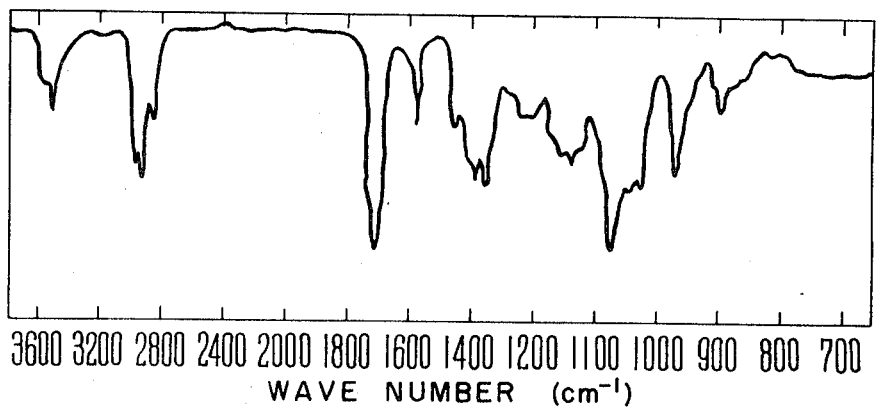

This invention relates to a new antibiotic Aabomycin-A having a strong antifungal and antiviral action against fungi such as *Piricuraria oryzae* (rice blast disease) and *Gloeosporium kaki* (anthracnose disease of kaki) and against viruses such as tobacco mosaic virus, Newcastle disease virus, herpes simplex virus, and parainfluenza virus, and to a process for preparing the same.

The present inventors found that Streptomyces sp. 325–17 fungus classified as the Streptomyces species in Actinomycetes, which has been named *Streptomyces hygroscopicus* (Jensen) Wawsman et Henrici subsp. aabomyceticus Seino, produces and accumulates a new antibiotic substance possessing antifungal and antiviral properties in its culture, and succeeded in isolating an effective substance from its culture as a pure crystal. This invention is based on this observation and resides in a process for the manufacture of Aabomycin-A characterized by the culture of a Streptomyces species fungus having the ability to produce Aabomycin-A and for collection of Aabomycin-A from its culture. This invention also covers the novel antibiotic Aabomycin-A.

The strain identified as Streptomyces sp. 325–17 has been assigned the American Type Culture Collection (ATCC) as ATCC access number 21449, and is on deposit with ATCC as an unrestricted deposit permitting the public full access to the culture. This strain was released for distribution to the public on Nov. 20, 1969.

DETAILED DESCRIPTION

The Streptomyces sp. 325–17 fungus used in this invention has the following properties. From these properties, the fungus No. 325–17 is considered to be a fungal strain belonging to the Streptomyces species in the Actinomycetes.

Micromorphology.—Vegetative mycelia dose is not fragmented into coccoid or bacillary form in liquid media such as in a glucose-nutrient broth. Some of the media such as Inorganic salts-starch agar, yeast extract-malt extract agar, Bennett agar, yeast extract-starch agar were useful for observation of micromorphology of this strain.

Spores (electronmicrograph).—Non-segmented, covered with capsular-like membrane, ornamentation of surface is fairly irregular, possibly warty to coarsely spined. Carbon repligraph and scanning electronmicrograph show the surface to be very rugose and indicate the morphological similarity to those of Type I spore group of *S. hygroscopicus* reported by Dietz et al. (1962).

Sporophores.—Short side branches located along straight or wavy main hyphae and terminated in closed spiral (Spirales) of two or more turns. Sporophores arranged singly, in pairs or occasionally in whorl-like along the axial mycelia. There is no evidence of the true verticillate branching. Diameter of spiral is $3.5\mu$ in average.

Cultural and physiological characteristics

The cultural and physiological studies are carried out at 28° C. and the results read at 21 days unless otherwise noted.

Sucrose nitrate agar plate (Sucrose Czapek agar)

Growth: Good, spreading, 2 ea (Light Wheat)
Aerial mycelium: Thin, powdery, almost white with 1 ea (Light Yellow) center
Soluble pigment: None Glycerol-nitrate agar plate (Glycerol Czapek agar)

Growth: Good, spreading, 2 fb (Buff) (Light Yellow, 86)
Aerial mycelium: Thin, powdery, white with g (Gray) center
Soluble pigment: Pale yellow Glucose-asparagine agar Growth: Good, spreading, 2 ea (Light Wheat)
Aerial mycelium: Abundant, powdery, 3 fe (Silver Gray) with moistened patches
Soluble pigment: None
Remarks: Hygroscopic Asparagine-dextrose agar plate (Haynes et al., Appln. Microbiol, 3:361, 1955)

Growth: Same as Glucose-asparagine agar plate
Aerial mycelium: Abundant, powdery, 5 fe (Ashes) (Light Grayish Reddish Brown, 45) with black moistened patches
Soluble pigment: None
Remarks: Hygroscopic Glycerol-asparagine agar plate (ISP)

Growth: Good, spreading, 2 ca (Light Ivory) (Pale Yellow, 89)
Aerial mycelium: Thin, powdery, 1 ba (Yellow Tint) (Pale Yellow, 89) to 3 dd (Natural)
Soluble pigment: Very faintly pink Glycerol-calcium malate agar plate Growth: Restricted, elevated, good, 2 ic (Light Gold)
Aerial mycelium: Abundant, powdery, 1 ic (Citron Yellow) to 3 ig (Beige Brown) (Grayish Yellowish Brown, 80)
Soluble pigment: None
Remarks: Calcium malate partially solubilized Inorganic salts-starch agar plate (ISP)

Growth: Abundant, spreading, 1 la (Lemon Yellow)
Aerial mycelium: Abundant, powdery, 4 li (Beaver) (Brownish Gray, 64)
Soluble pigment: Light yellow
Remarks: Hydrolytic activity is positive Tyrosine agar plate (ISP)

Growth: Good, elevated, 3 le (Cinnamon) to 4 nl (Dark Brown)
Aerial mycelium: Abundant, powdery, 4 li (Beaver) (Brownish Gray, 64)
Soluble pigment: 3 le (Cinnamon)
Remarks: Tyrosinase reaction is doubtful Yeast extract-malt extract agar plate (ISP)

Growth: Abundant, 1 ia (Lemon Yellow) to more dark colored
Aerial mycelium: Abundant, powdery, 4 li (Beaver) (Brownish Gray, 64)
Soluble pigment: Light yellow Oatmeal agar plate (ISP)

Growth: Good, restricted, not elevated, 1½ ca (Cream)
Aerial mycelium: Good, powdery, 4 li (Beaver) (Brownish Gray, 64)
Soluble pigment: None Bennett agar plate Growth: Elevated, good, 1 ga (Light Yellow)
Aerial mycelium: Abundant, powdery, nearly 5 fe (Ashes) (Light grayish Reddish Brown, 45)
Soluble pigment: 1 ca (Lemon Yellow)

Yeast extract-starch agar plate [1]

Growth: Abundant, elevated, spreading 1 ga (Light Yellow) with dark colored center
Aerial mycelium: Abundant, powdery, 3 ig (Beige Brown) (Grayish Yellowish Brown, 80)
Soluble pigment: Light Yellow Nutrient agar (Difco Bacto Nutrient agar)

Growth: Moderate, 1½ ca (Cream)
Aerial mycelium: Good, thin, powdery, white
Soluble pigment: None Tables 1 and 2 present results obtained in a series of various physiological tests of the strain 325–17.

TABLE 1

| | Media employed | Responses |
|---|---|---|
| Melanin formation | Peptone iron agar (Difco). | Negative. |
| | Melanin formation agar stab. | Doubtful (3 le). |
| | Tyrosine agar ISP. | Doubtful. |
| Tyrosinase reaction | Tyrosine agar ISP. | Do. |
| Xanthine decomposition | Xanthine agar. | Negative. |
| Hydrogensulfide production. | Peptone iron agar (Difco). | Do. |
| Nitrate reduction | Glucose-nitrate broth. | Do. |
| | Nitrate broth (Difco). | Do. |
| Liquefaction of gelatin | 20% Difco Bacto Gelatin. | Positive. |
| Digestion of milk | 10% Difco skim milk. | Peptonized. |
| Liquefaction of serum | Difco Löffler serum medium. | Positive. |
| Cellulolytic activities | Filter paper plus Czapek broth without carbon source. | Probably negative. |
| Temperature range | Bennett's agar. | No growth at 5° C. and 50° C. |
| Oxygen requirement | Glycerol nutrient broth under $CO_2$ atmosphere. | Aerobic. |

TABLE 2

Utilization of carbohydrates of the strain 325–17 in Pridham and Gettleib's synthetic medium

| Carbohydrate | Response [1] | Carbohydrate | Response [1] |
|---|---|---|---|
| L-arabinose | ± | Sucrose | ++ |
| D-glucose | ++ | Treharose | ++ |
| D-galactose | ++ | D-xylose | ++ |
| Glycerol | ++ | Aesculin | − |
| Lactose | ++ | Salicin | − |
| D-levulose | ++ | Inulin | + |
| D-(+)-mannose | ++ | Adonitol | ++ |
| Maltose | ++ | Dulcitol | − |
| D-(+)-melezitose | − | i-Inositol | ++ |
| Melibiose | ++ | D-mannitol | ++ |
| Raffinose | ++ | D-sorbitol | − |
| Sorbose | − | | |

[1] ++=Strongly positive utilization. +=Positive utilization. ±=Utilization doubtful. −=Utilization negative.

To culture the said Streptomyces sp. 325–17 to produce Aabomycin-A, the known method for culture of Actinomycetes or its modifications can be used but it is advantageous to carry out the culture by aeration-stirring

[1] Yeast extract 2 g., soluble starch 10 g., agar 15 g., distilled water 1000 ml., pH 7.0.

in the fermentation tank for industrial production. The temperature during culture should be maintained at about 25–32° C. For the medium, usual materials used for the culture of Actinomycetes can be used in optional combinations, such as various carbon sources, nitrogen sources, inorganic salts, growth promotors, and antifoaming agents. The amount of Aabomycin-A produced usually reaches the maximum after 2–5 days of culture.

Aabomycin-A is extracted and purified from the above culture by utilization of its physicochemical properties. Aabomycin-A is contained in largest amount in the culture filtrate but is also present in the fungal cells, and in some cases, the amount of the fungal cells is considerably large. Aabomycin-A is soluble in butyl acetate and other organic solvents. By mixing the culture with these solvents, the antibiotic is extracted by the solvent. In some cases, fungal cells can be separated from the culture filtrate by filtration, the filtrate can be mixed with the above solvents to extract Aabomycin, and the fungal cells can be extracted with hydrophilic solvents like acetone. When the fungal cells have been extracted with a hydrophilic solvent, the solvent is concentrated under reduced pressure and the concentrated solution is extracted with an organic solvent such as butyl acetate in the same manner as the procedure used with the culture filtrate. The solutions of the extract thereby obtained are combined and evaporated under reduced pressure. The syrupy concentrate thus obtained is extracted with a small volume of chloroform to obtain Aabomycin-A and the extract is passed through a chromatographic column filled with alumina. Development is effectively carried out by consecutive elution with benzene, chloroform, and butyl acetate-methanol (10:1) mixture. The effluent is fractionated and antifungal activity is tested with Piricularia oryzae as the test organism so that only the active fractions are collected. The fractions so collected are combined and evaporated to dryness. The residue thereby obtained is dissolved in an amount of chloroform as small as possible and benzene is added dropwise so that the crude crystals of Aabomycin-A precipitate out. These crystals are collected and recrystallized to colorless needles. For recrystallization a solvent, which is a mixed system of benzene-chloroform, ethyl acetate-hexane, and methanol-water is recommended.

Examination of the culture by paper chromatography and detection by bio-autography indicate the presence of at least two or more antifungal substances besides Aabomycin-A but the content of these substances is markedly smaller than Aabomycin-A and their properties are still unidentified.

Aabomycin-A has the following properties:

(1) Colorless needle crystals, M.P. 144–145° C.

(2) *Elemental analysis.*—Calcd. for $C_{39-40}H_{65-67}O_{11}N$ (percent): C, 64.71, 65.10; H, 9.05, 9.15; N, 1.93, 1.89. Found (percent): C, 63.67; H, 9.17; N, 1.95.

(3) Molecular weight: 723.918–737.944. (Vapor pressure equilibrium method gave value of 770.)

(4) Specific optical rotation: $[\alpha]_D^{20} + 93.5°$ (c.=1, $CHCl_3$)

(5) Solubility: Easily soluble in methanol, ethanol, acetone, ethyl acetate, butyl acetate, chloroform, and ether, slightly soluble in ammonia water, benzene, and carbon tetrachloride, and sparingly soluble or insoluble in water, hexane, and petroleum ether.

(6) Infrared absorption spectrum: As shown in FIG. 1 (in chloroform solution).

Figure 2:
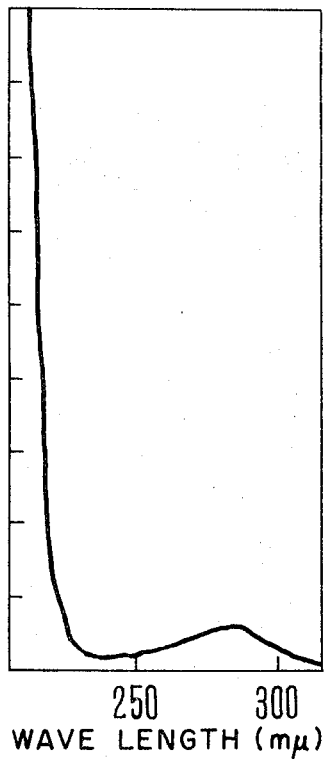
Figure 3:
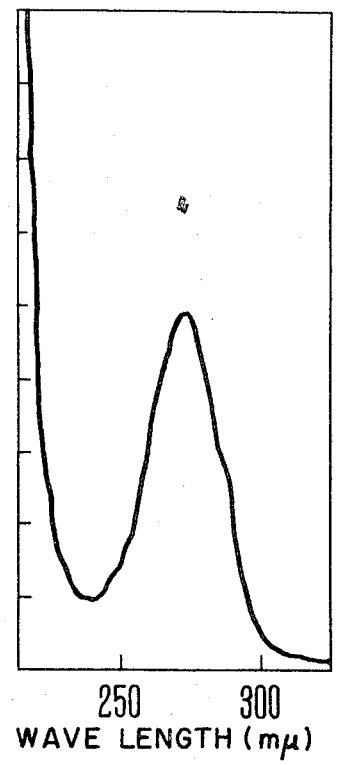

(7) Ultraviolet absorption spectrum: As shown in FIG. 2, absorption maximum in neutral methanol or in 0.1 N hydrochloric acid-methanol solution is present at 280 m$\mu$ ($E_{1cm}^{1\%}$ 1.67)

and in 0.1 N sodium hydroxide-methanol solution, as shown in FIG. 3, the absorption maximum is at 273 m$\mu$ ($E_{1cm}^{1\%}$ 65.0)

(8) Color reactions: Positive to potassium permanganate, Fehling and Molisch reactions. Treatment on silica gel thin-layer with sulfuric acid gives the characteristic violet color. Ninhydrin, Biuret, Sakaguchi, 2,4-dinitrophenylhydrazine, and ferric chloride reactions are all negative.

(9) Thermostability: Aabomycin-A was dissolved in methanol-water (1:1) mixture, adjusted to various pH 5, and allowed to stand for 24 hours. There was no lowering of antifungal activity in any of the solutions. The same samples were heated at 100° C. for 5 minutes. There was almost no lowering in antifungal activity when the solution was adjusted to pH 7–9 but the activity disappeared almost entirely when adjusted to pH 2–4.

(10) Stability against ultraviolet irradiation: When the antibiotic was irradiated with a chemical lamp (bactericidal lamp, Toshiba® GL–15 type) from a distance of 45 cm., there was no lowering of antifungal activity even under a continuous irradiation for 1 week.

(11) Chromatograms: The Rf values in various chromatography are indicated below (developing solvent in parentheses).

Paper chromatography: 0 (benzene), 0 (chloroform), 0.80 (ethyl acetate), 0.10 (ethyl acetate-benzene=1:1), 0 (chloroform-benzene=1:1), 0.23 (benzene-ethyl acetate=1:2).

Thin-layer chromatography over silica gel: 0 (benzene), 0 (chloroform), 0.82 (ethyl acetate), 0.35 (ethyl acetate-benzene=1:1), 0 (chloroform-benzene=1:1), 0.47 (benzene-ethyl acetate=1:2), 0.10 (benzene-ethyl acetate=2:1).

(12) Electrophoresis: Sephalax® was used as the carrier and electrophoresis was carried out at 10 ma. for 30 minutes. No mobility when using phosphate buffer of pH 7.0, and slight movement towards the anode when using ammonia-ammonium chloride buffer of pH 10.5.

(13) (A) Antifungal spectrum is shown in Table 3 (by the agar dilution method).

TABLE 3

| Test organisms | Minimum inhibition concentration (mcg./ml.) |
|---|---|
| Piricularia oryzae | 0.001 |
| Cochliobolus miyabeanus | 3.0 |
| Gloeosporium lacticolor | 10.0 |
| Gloeosporium kaki | 1.0 |
| Pellicularia filamentosa | 10.0 |
| Glomerella cingulata | >100 |
| Cladosporium fulvum | 100 |
| Macrosporium batapicola | 10.0 |
| Trichophyton asteroides | 1.5 |
| Trichophyton rubrum | 0.8 |
| Trichophyton mentagrophytes | 1.5 |
| Candida albicans 57 | 12.0 |
| Staphylococcus aureaus FDA 209 P | >100 |
| Pseudomonas aeruginosa | >100 |
| Mycobacterium smegmatis ATCC 607 | >100 |
| Escherichia coli NIHJ | >100 |
| Xanthomonas oryzae | >100 |
| Shigella dysenteriae | >100 |

(B) Antiviral Activity

B–1 Antiviral activity against TMV

Four-week old seedlings of Nicotiana tabacum var. Xanthi were used as the test plants and the coleoptile of 2-week old seedlings of Phaseolus vulgaris L., Pinto, were used for the local lesion test. Leaf discs (radius 11 mm.) of Nicotiana tabacum L. var. Blight yellow were used for disc-assay.

As shown in Table 4, when leaf discs which were prepared immediately before inoculation were floated on various concentrations of the antibiotic in 40 mm. petri dishes under 3,000 lux fluorescent illumination at 25° C., the multiplication of TMV in the disc was significantly inhibited when the antibiotic concentration exceeded 1 mcg./ml.

TABLE 4

| Materials | Concentration (mcg./ml.) | Protective value,[1] percent | Phyto toxicity |
|---|---|---|---|
| Aabomycin A | 100.0 | 99.8 | — |
|  | 10.0 | 87.0 | — |
|  | 1.0 | 82.0 | — |
| Blasticidin S | 0.01 | 86.0 | + |
|  | 0.005 | 87.0 | ± |
|  | 0.001 | 82.0 | — |

[1] Protective value $$= \left(1 - \frac{\text{virus titer (antibiotic-treated leaf)}}{\text{virus titer (antitiotic-untreated leaf)}}\right) \times 100$$

[2] —=No phytotoxicity. ±=Slight phytotoxicity. +=Low phytotoxicity.

B–2 Antiviral activity against NDV and HSV (1) Antiviral activity of Aabomycin-A was examined by the agar-diffusion plaque-inhibition method, using Newcastle disease virus as the RNA-type viros and herpes simplex virus as the DNA-type virus. The results are shown in Table 5. For this test, Newcastle disease virus or herpes simplex virus was inoculated on the confluent monolayer cultures of chick embryo fibroblast in petri dishes, and covered with soft agar medium, paper discs of 8 mm. in diameter, soaked with 0.02 ml. of the antibiotic solution, were placed on the hardened agar, and the diameters of cytotoxic zone (CTZ) and antiviral zone (AVZ) were measured.

TABLE 5

| Drug concentration ($\mu$g./ml.) | Newcastle disease virus | | Herpes simplex virus | |
|---|---|---|---|---|
|  | CTZ | AVZ (mm.) | CTZ | AVZ (mm.) |
| 50,000 | + | 18.0 | + | 22.5 |
| 25,000 | + | 16.3 | + | 20.7 |
| 12,500 | ± | 16.8 | + | 17.5 |
| 6,250 | — | 16.3 | — | 17.0 |
| 3,125 | — | 16.8 | — | 17.1 |
| 1,562 | — | 15.5 | — | 16.4 |
| 781 | — | 16.5 | — | 16.0 |
| 390 | — | 15.9 | — | 16.5 |
| 195 | — | 15.2 | — | 15.4 |
| 98 | — | 16.3 | — | 15.8 |
| 49 | — | 15.1 | — | 15.7 |
| 24 | — | 13.7 | — | 12.9 |
| 12 | — | 12.8 | — | 13.6 |
| 6 | — | — | — | ± |

(2) The antiviral activity of Aabomycin-A was tested with hatched eggs and the results are given in Table 6. The Newcastle disease virus was inoculated in 12-day old embryonated eggs, $10^5$ PFU to one egg, and at the same time, Aabomycin-A was administered. After maintaining the eggs at 39° C. for 2 days, the chlorioallantoic fluid was collected and its hemagglutination unit was measured.

TABLE 6

| Drug concentration ($\mu$g/egg) | Growth of chick embryos | Hemagglutination unit | Inhibition rate, percent |
|---|---|---|---|
| 40 | Normal | 10 | ≈100 |
| 20 | do | 10 | ≈100 |
| 10 | do | 10 | ≈100 |
| 5 | do | 10 | ≈100 |
| 1 | do | 20–400 | 80–99 |
| 0.8 | do | 20–1,600 | 0–99 |
| Control | do | 1,600–3,200 |  |

Growth of chick embryo was compared with that of non-infected, non-treated control to examine the effect of Aabomycin-A on the growth of embryo but, as shown in Table 6, there was no effect of the antibiotic. This test was carried out with 10 eggs for each concentration of the antibiotic.

This antibiotic has no antibacterial action aaginst gramnegative bacteria.

(14) Toxcity Test

The acute toxicity of Aabomycin-A was tested by its intraperitoneal administration in female ddN strain mice and its results are shown in Table 7.

TABLE 7

| | Antibiotic concentration— | |
|---|---|---|
| | 100 (mg./kg.) | 500 (mg./kg.) |
| Solvent | 10% ethanol solution | Olive oil. |
| No. dead by 10th day/ No. treated. | 0/5 | 2/4. |
| Autopsy | No changes seen at autopsy of mice on 10th day. | Adrenal engorgement seen in dead animals (3rd to 5th day). |

A 25% solution of Aabomycin-A in a mixed solvent of methanol, propylene glycol, and Tween 20 was painted on the same strain mice, 10 times during 2 days but no inflammation of the skin was observed. The toxicity in fish was tested with killifish but the antibiotic was entirely harmless, even at a concentration of 1000 mg./1.

There is no report on the known antibiotics having various properties that agree entirely with the above properties and the present substance is considered to be a new antibiotic.

When using the foregoing Aabomycin-A, it is mixed with various kinds of a carrier which may be any of the substances that would not destroy Aabomycin-A. It can be either a solid or a liquid, and is not limited to a specific substance. For example, talc, clay, kaolin, silica, Bentonite, and diatomaceous earth are useful as a solid carrier, while organic solvents such as alcohols, esters, and benzene, and their mixture may be cited as a liquid carrier. In addition, substances generally used as auxiliary agents such as an emulsifier, spreader, disperser, and adhesives can be compounded optionally to increase the effect.

In case of medical use, since Aabomycin-A is only sparingly soluble in water, it is dissolved in olive oil or other vegetable oils or dissolved in a minute amount of organic solvent and diluted to the desired concentration to prepare injections or liquids. The antibiotic can also be prepared into powders or granules with bulking agents such as starch and lactose.

EXAMPLE 1

Liquid medium consisting of 2% of glucose, 0.5% of beef extract, 0.5% of peptone, and 0.5% of sodium chloride was poured into flasks, Streptomyces sp. No. 325-17 was inoculated, and the flasks were shake-cultured at 26–27° C. for 2 days to obtain pre-incubated fungal liquid. In a stainless steel fermentation tank of 200-liter capacity, 100 liters of a medium consisting of 4% of glucose, 2.5% of soybean cake, 0.4% of dried brewer's yeast, 0.1% of beef extract, and 0.2% of sodium chloride was charged, 1 liter of the foregoing fungal liquid was inoculated, and the culture was carried out at 26–27° C. with aeration. After 96 hours of culture, antifungal activity against the Piricularia oryzae became the maximum. After completion of the culture, 4% of diatomaceous earth was mixed in this culture liquid which was filtered and the filtrate was adjusted to pH 7.0. This filtrate was extracted with 50 liters of ethyl acetate and the solvent layer was separated. The wet fungal cake was extracted with 30 liters of acetone, which was filtered and the extract was concentrated under a reduced pressure to 7 liters. This solution was adjusted to pH 7.0, extracted with the same volume of ethyl acetate, the solvent layer was combined with the solvent layer obtained from the culture filtrate, and the combined solvent was evaporated under reduced pressure to a syrupy concentrate. This concentrate was dissolved in a small volume of chloroform. A chromatographic column was filled with 500 g. of activated alumina suspended in benzene and the foregoing chloroform solution was poured over this column. The column was eluted consecutively with benzene and chloroform, and finally with a mixed solvent of ethyl acetate and methanol (10:1). The effluent was fractionated, each fraction was tested for antifungal activity using Piricularia oryzae as the test organism, and the fractions having a strong activity were combined. The combined fraction was evaporated to dryness under reduced pressure and the residue was extracted with a small volume of chloroform. Benzene was added dropwise into this chloroform extract, the precipitate formed was collected, and dissolved in methanol. Distilled water was added dropwise into this methanol solution until a turbidity formed and the whole mixture was allowed to stand overnight in a cold room. Needle crystals of Aabomycin-A were collected by filtration, washed with a small volume of cold diluted water, and dried to ca. 14 g. of Aabomycin-A crystals.

EXAMPLE 2 (Hydrated agent)

| | Parts |
|---|---|
| Aabomycin-A | 2 |
| Nonylphenol poly(oxyethylene glycol) ether 10M | 4 |
| Diatomaceous earth | 94 |

The above composition was mixed homogeneously, pulverized, and diluted with water. Usually, 100–180 liters per 10 a was used by spraying.

EXAMPLE 3 (Emulsified agent)

| | Parts |
|---|---|
| Aabomycin-A | 2 |
| Nonylphenol poly(oxyethylene glycol) ether 10M | 4 |
| Methanol | 94 |

The above composition was dissolved uniformly and diluted with water. Usually, 100–180 liters per 10 a was used by spraying.

EXAMPLE 4 (Powdered agent)

| | Parts |
|---|---|
| Aabomycin-A | 0.2 |
| Clay | 99.8 |

The above substances were mixed homogeneously and pulverized. Usually, 3–4 kg. per 10 a was used by spraying.

EXAMPLE 5

Seeds of paddy rice (Oryza sativa, strain "Jukkoku") are sown directly in cultivation pots (10 stocks/pot), the test solution is sprayed at the time when 4–5 leaf blades are out, and Piricularia oryzae is inoculated when the test solution has dried, by spraying a suspension of the spores of this organism cultured in a rice-hull medium (3 g. of rice hulls, 0.01 g. of powdered yeast extract, 0.2 g. of sugar, 0.05 g. of starch, and 5 ml. of water) at 27° C. for 7–10 days. The suspension is sprayed over the plants in an inoculation chamber, and the plants are allowed to stand in a thermostatic moisture chamber at 25° C. for 24 hours. The pots are then placed in vats filled with warm water and covered with a plastic tent. After 5–7 days, the blast disease will spread and the number of diseased spots per pot is counted. From this number protective value is calculated and potency of the test solution is examined. The results obtained are shown in Table 8.

$$\left[\text{Protective value} = \frac{\left(\begin{array}{c}\text{No. of spots in}\\\text{non-treated field}\end{array}\right)-\left(\begin{array}{c}\text{No. of spots in}\\\text{treated field}\end{array}\right)}{\text{No. of spots in non-treated field}} \times 100\right]$$

TABLE 8

| Chemical agent used | Concentration of agent (p.p.m.) | No. of spots | Protective value | Phytotoxicity |
|---|---|---|---|---|
| 1. Aabomycin-A | 2 | 143.5 | 66 | |
| 2. do | 10 | 13.0 | 97 | |
| 3. do | 20 | 4.5 | 99 | |
| 4. Blasticidin-S | 10 | 21.0 | 95 | |
| 5. do | 20 | 8.5 | 98 | |
| 6. None | | 425.5 | | |

EXAMPLE 6

The antibiotic was sprayed on the seedlings of Nicotiana tabacum var. Xanthi, immediately after the inoculation of TMV crude extract. The results shown in Table 9 suggest that the antibiotic inhibited TMV multiplication in the tobacco plant at the concentrations less than 100 p.p.m. No phytotoxicity was evident even at a concentration of 1,000 p.p.m. Furthermore, when the antibiotic was sprayed on test plants, 2 days before inoculation, the inhibitory effect of the antibiotic increased. This indicated that the protective effect was higher than curative effect.

TABLE 9

| Concentration of Aabomycin-A (p.p.m.) | Post-inoculation time of— | | | | |
|---|---|---|---|---|---|
| | 0 hrs. | 24 hrs. | 48 hrs. | 72 hrs. | 96 hrs. |
| 1 | 15 | 52 | 74 | 75 | 61 |
| 10 | 61 | 89 | 92 | 88 | 80 |
| 100 | 82 | 95 | 98 | 97 | 89 |

[Control value (*)
$= \left(1 - \frac{\text{Titer of TMV content in aabomycin-treated seedling}}{\text{titer of TMV content in untreated seedling}}\right) \times 100$]

EXAMPLE 7

Twenty-five male white Leghorn chicks were raised for 3 weeks after hatching, with complete prevention of infection of diseases, and divided into five groups of 5 chicks each. The commercial complete feed for chicks, free of any antibiotics, was used. These chicks were intramuscularly injected with Miyadera strain of Newcastle disease virus, $10^4$ PFU/chick, and 0.1, 0.2, 0.3, or 0.4 ml. of a solution of 3 g. of Aabomycin-A dissolved in olive oil J.P. and diluted to 10 ml. The antibiotic solution was injected once a day for two days and the chicks were observed every day for one week after administration of the antibiotic. Results of this test are given in Table 10.

TABLE 10

| Group | Amt. of Aabomycin given (mg./kg.) | No. dead | No. treated | Rate alive after 1 week | Pathological condition |
|---|---|---|---|---|---|
| 1 | 30 | 1 | 5 | 80 | Greenish diarrhoeal droppings and nervous symptoms seen in dead chicks. |
| 2 | 60 | 0 | 5 | 100 | No change. |
| 3 | 90 | 0 | 5 | 100 | Do. |
| 4 | 120 | 0 | 5 | 100 | Do. |
| 5 | 0 | 5 | 5 | 0 | Greenish diarrhoeal droppings and nervous symptoms. |

We claim:

1. A new antibiotic Aabomycin-A having
   (a) a molecular formula of $C_{39-40}H_{65-67}O_{11}N$
   (b) a specific rotation of $[\alpha]_D^{20}$ $+93.5°$ (c.=1, $CHCl_3$)
   (c) with the infrared spectrum characteristics shown in FIG. 1 and ultra-violet absorption spectra of $\lambda_{max}^{0.1N\ HCl-methanol} = 280 m\mu (E_{1cm}^{1\%}\ 1.67)$ $\lambda_{max}^{0.1N\ NaOH-methanol} = 273 m\mu (E_{1cm}^{1\%}\ 65.0)$ (d) positive to potassium permanganate, Fehling and Molisch reactions
   (e) negative to Ninhydrin, Biuret, Sakaguchi, 2,4-dinitro-phenylhydrazine and ferric chloride reactions
   (f) M. P. of 144°–145° C.

said Aabomycin-A being soluble in methanol, ethanol, acetone, ethyl acetate, butyl acetate, chloroform and ether but sparingly soluble or insoluble in water, hexane and petroleum ether.

2. A process for preparing the new antibiotic Aabomycin-A as defined in claim 1 which comprises inoculating a strain of Streptomyces sp. 325-17 (ATCC 21449) in a culture medium composed of a carbon source, a nitrogen source and an inorganic material, cultivating said medium at a temperature of from about 25 to 32° C. for a time sufficient to impart substantial antibiotic activity to said culture medium and then collecting said antibiotic from said medium.

3. A process according to claim 2, wherein the cultivation is carried out under aerobic submerged fermentation.

References Cited
UNITED STATES PATENTS

| 3,018,220 | 1/1962 | McGuire et al. | 424—118 |
| 3,094,460 | 6/1963 | De Boer et al. | 424—118 |
| 3,155,520 | 11/1964 | Ziffer | 424—118 |

SAM ROSEN, Primary Examiner

U.S. Cl. X.R.

195—80